Jan. 11, 1966    F. R. FEDER    3,229,002
METHOD OF TREATING THERMOPLASTIC RESIN IN FINELY
DIVIDED FORM TO IMPROVE FLOWABILITY
Filed June 9, 1964
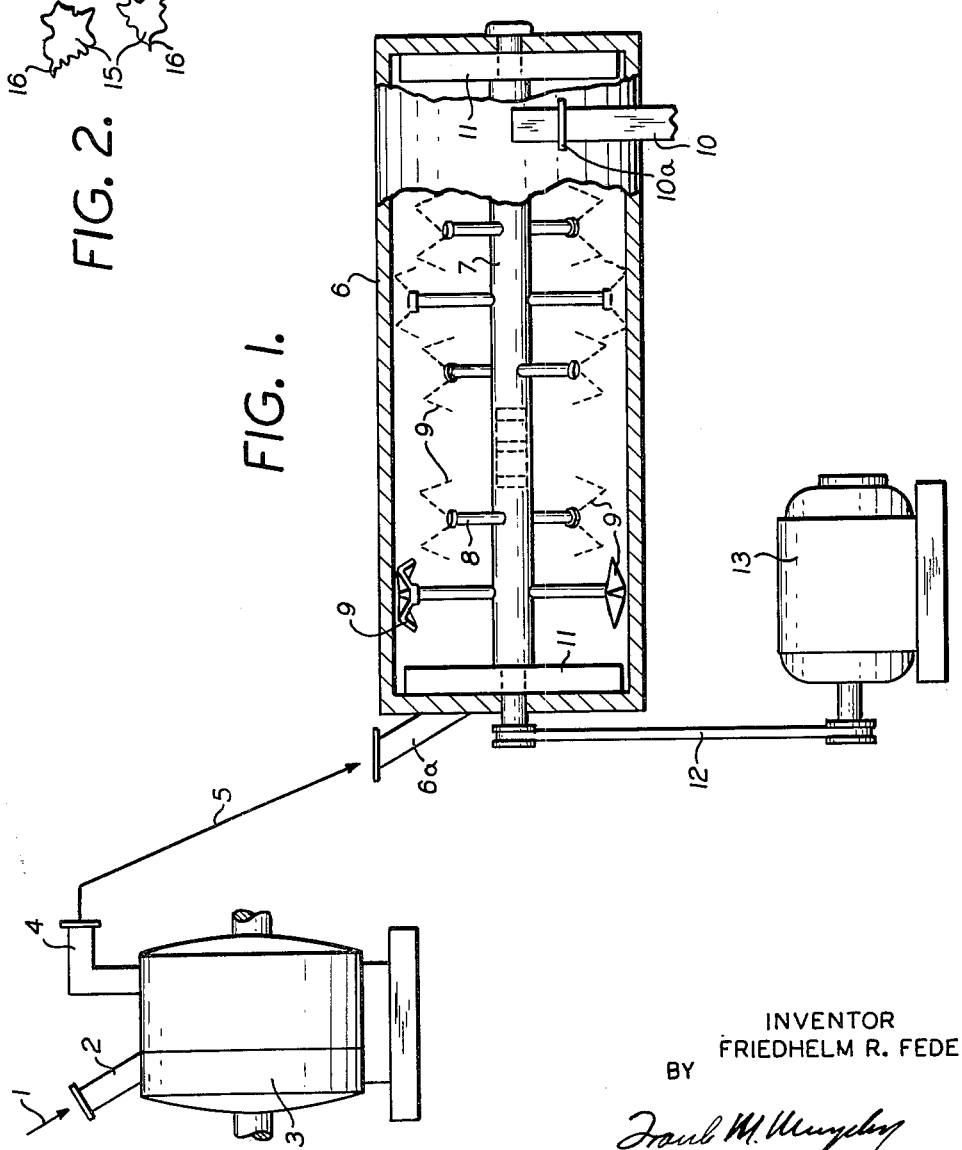
INVENTOR
FRIEDHELM R. FEDER
BY
Frank M. Humphrey
ATTORNEY.

United States Patent Office 3,229,002
Patented Jan. 11, 1966

3,229,002
METHOD OF TREATING THERMOPLASTIC RESIN IN FINELY DIVIDED FORM TO IMPROVE FLOWABILITY
Friedhelm R. Feder, Westfield, N.J., assignor to Wedco, Inc., Garwood, N.J., a corporation of New Jersey
Filed June 9, 1964, Ser. No. 373,792
18 Claims. (Cl. 264—15)

This invention relates to the treatment of finely divided thermoplastic resin, and has as an object to provide a procedure and apparatus for improvement in flowability of such material. A further object is to provide a procedure whereby bulk density of the material is increased.

In the production of resins, the product of the reaction wherein the resin is produced is commonly mixed with stabilizers, additives, plasticizers, etc. and this admixture is then worked into a homogeneous material by known processing steps such as simultaneous heating and extrusion of the material. The resulting homogeneous product is granulated to provide pellets which can be up to about one-fourth inch in size, and are commonly in the size range of about one-eighth inch to one-fourth inch. The pellets are packaged and constitute a common material of commerce.

For many services, such as slush molding, rotational molding, fluid bed coating, spray-on coating, coloring (surface coating), rug backing, etc. the pellets are pulverized to provide the material in a finer particle size. The particle size of the pulverized material can be in the range of 100% —12 mesh, 10% —100 mesh to 100% —80 mesh, 10% —200 mesh. Particle sizes outside of this range can be used, though, in general, the particle size of pulverized material will fall within this range. The pulverizing is commonly carried out in attrition mills, for example, disc mills, or pulverizing can be carried out in an impact mill, such as a hammer mill.

In respect to pulverized resin, a problem exists in that the flowability of such material is poor. Accordingly, the handling and utilization of the pulverized material is accompanied by disadvantages occasioned by such properties.

In the case of hollow articles produced by molding, the mold is commonly partially filled with the plastic in finely divided form, is then closed, and then moved, for example by rotation, to distribute the finely divided material over the inner surface of the mold. Simultaneously with the movement of the mold, heat can be applied to cause softening and melting of the material so that by the combined action of movement of the mold and heat, the thermoplastic material is provided as a layer covering the inner mold surface. Suitable cooling techniques can then be utilized to effect a solidification of the resin, and the mold can then be separated for removal of the article. In the production of articles by such molding, the flow characteristics of the thermoplastic material are of considerable importance. The shapes to be molded are often quite complicated, for example, plastic horses, which involve extensions for the legs. In the case of such shapes, the quality of the molded article depends on the flowability of the power. In order that the material be suitably distributed to difficultly accessible mold parts, good flow properties of the powder are necessary. Defects attributable to the use of powder having poor flow characteristics include the presence of excessively thin portions at places of the molded article corresponding to relatively inaccessible parts of the mold.

A further consideration with respect to production of hollow molded articles as are discussed above, is with respect to the amount of thermoplastic material which can be charged for the molding operation. Thus, commonly multi-part molds are used and the amount of resin which can be charged depends on the density of the resin and the structure of the mold. In the case of a simple two-piece mold wherein the mold parts are of like geometric form and the same in dimensions, the amount of resin which could be charged would be that corresponding to the holding capacity of one of the mold parts. Accordingly, in such cases, for a given two-part mold, the weight of resin charged would depend on the bulk density of the resin. The procedure of the invention offers the advantage of effecting an increase in density of the material, and thus, makes possible increasing the charge to the mold.

Another operation in which flow properties are important is in respect to fluid bed operations. Thus, it has been found that difficulty is encountered in forming a fluidized bed by passing an air stream through a mass of the particles at rest, if the material has poor flow properties. The process of the invention can be used to obviate such difficulty.

It has been found that flowability of finely divided thermoplastic resin can be significantly improved by the simple expedient of agitating a mass of the particles to generate heat therein from friction between the particles to heat the particles substantially without occurrence of agglomeration thereof. The agitation is continued for a time, which can readily be determined by experiment, sufficient for modification of the particles to provide the improvement in flowability.

As to the resins which can be treated according to the invention, any thermoplastic resin can be treated. Thus, the procedure of the invention is well suited for the treatment of pulverized polyethylene, polypropylene, nylon, Teflon brand polytetrafluoroethylene, Penton brand resin of Hercules Powder Company, polyvinylchloride, and polyacrylates such as polymethylmethacrylate, cellulose acetate, and cellulose acetate butyrate. Thermoplastic copolymers can also be treated according to the invention. The treatment of the invention involves essentially a physical phenomenon, and thus is not dependent on the chemical composition of the material. Any thermoplastic resin can be treated by the procedure of the invention.

The procedure has been found particularly well suited for the treatment of the polyethylene, including high density and low density polyethylene.

The invention finds particular application in the case of thermoplastic resin material in finely divided form, wherein the resin particles have relatively sharp pulverized resin protuberances as are produced in conventional pulverizing equipment, such as disc mills, hammer mills, etc., by the working of the material at normal temperature in such equipment. The new method, however, can also be utilized to improve the flow properties of thermoplastics which have been pulverized or size reduced in the presence of liquid nitrogen. Further, it can be utilized to improve the flow properties of thermoplastic fluffs, e.g., polyethylene fluff, which can be high pressure polyethylene in original form before addition of stabilizers, etc., and extrusion, etc. for the production of pellets.

In referring to the use of normal temperature in the pulverizing, it is meant to distinguish from low temperature size reduction operations, as for example the size reduction of resin in the presence of liquid nitrogen. In the pulverizing of material to produce a finely divided material for treatment according to the invention, temperature rise above normal temperature may occur as an incident of the pulverizing operation, such as pulverizing in a disc mill. Such pulverizing operations are here considered as "normal" temperature pulverizing operations.

The invention is further described in reference to the accompanying drawing, wherein:

FIG. 1 is a schematic representation of apparatus suitable for the practice of the invention; and FIG. 2 is a schematic representation of pulverized resin particles.

The method of the invention can be practiced with conventional blenders as are commonly used in the chemical industry for the admixing of ingredients. Such apparatus comprises a vessel having stirrers mounted therein and means for moving the stirrers to agitate material contained in the blender. In practice, a mass of material is collected in the blender and agitation thereof is continued in accordance with the results to be realized. In the procedure of the invention, finely divided material can be continuously added to the blender and continuously withdrawn therefrom and a suitable hold-up time can apply so that there is provided a residence time such that the desired improvement in flowability and density is realized.

Referring to the drawing, pellets of thermoplastic material are introduced via line 1 to the inlet 2 of disc mill 3, and are pulverized therein to provide the resin in finely divided pulverized condition. The product of the disc mill is withdrawn through outlet 4 and introduced into line 5 which conveys the material to the blender 6. The pulverizing operation can be carried out in a closed circuit as is known in the art, so that oversize material in the product of the disc mill is separated and recirculated. Such process is not pertinent to the invention and, accordingly, is not illustrated in the drawing.

The blender 6 is a hollow cylindrical vessel disposed with its axis horizontally. The stirrers are in the form of plow heads 9 mounted on the cross bars 8, which, in turn, are mounted on the shaft 7. A plow head 9 is mounted on each end of each of the cross bars 8, such that it is spaced from the inside wall of the blender, a short distance such as ⅛ inch. The cross bars 8 are spaced axially along the vessel, and the axially extending dimensions of the plow heads 9 are such that there is a small overlap of the paths of adjacent plow heads. Further, the cross bars 8 are disposed in an angular relation with respect to each other so as to provide the cross bars in a uniform array within the blender. The inlet 6a to the blender is disposed at one end thereof while an outlet 10 is disposed at the other end thereof. The outlet is provided with a valve 10a in the form of a movable plate which can be positioned in the outlet to control flow of material therethrough. A motor drive 13 for the shaft 7 is connected to shaft 7 by the drive belt 12. At each end of the vessel, a scraper 11 is mounted on the shaft 7. The scrapers can be spaced about ⅛ inch from the ends of the vessel and serve to insure against any substantial accumulation of material as a cake on the ends of the blender.

The surface condition of a pulverized resin particularly suited to treatment by the procedure of the invention is depicted in FIG. 2, wherein enlargements of the particles are shown. Such particles can be produced by pulverizing pellets at normal temperature. They have protuberances of particles pulverized at normal temperature. It will be observed that these particles 15 have protuberances 16 and are characterized by a rough surface. During the processing of the invention, size of the protuberances is reduced and there is a reduction in the roughness of the surface of the particles. This size reduction and reduction in roughness, however, is not substantial, and it cannot be said with certainty that the improvement of the invention is due to the change in surface which is apparent from observation. It may be that the flexibility of the protuberances is altered or that a bending thereof occurs. Whereas the poor flowability of the pulverized material is generally attributed to the presence of protuberances as is depicted in FIG. 2, it is surprising that the treatment of the invention which does not substantially reduce the protuberances, nevertheless does substantially increase flowability. The bulk density change is also substantial and is greater than would be estimated from a mere examination of the form of the particles before and after the treatment.

It is also surprising that the treatment according to the invention does not involve substantial agglomeration of the particles. Thus, the particle size, based on screen analysis, does not change substantially during the treatment. Where the starting pulverized material is a −35 mesh material, the product will be substantially −35 mesh.

As a range for particle size of the pulverized material, can be mentioned: 100% −12 mesh, 10% −100 mesh to 100% −80 mesh, 10% −200 mesh. Examples of particle size specifications for the pulverized material are: 100% −12 mesh, 10% −100 mesh; 100% −50 mesh, 25% −150 mesh; or 100% −80 mesh, 10% −200 mesh.

It is not necessary to supply heat in addition to that developed by friction of the material. Preferably friction alone is relied upon, since the utilization of other means involves the danger of hot spots in the blender as would cause melting, agglomeration and caking up. If desired, however, the blender can be jacketed and a relatively low temperature can be maintained in the jacket to supply a part of the heat for the processing.

While in the blender the material is whirled up and to some extent is dispersed in the air present in the blender, it is believed that the beneficial effect resulting from the procedure of the invention is due to the frictional engagement of the particles during the agitation thereof.

By "agitation" herein, reference is made to a treatment wherein though some dispersion of material may occur, the predominant phenomenon is one wherein the particles as a mass are kept in motion. The agitation involves stirring of the material.

As is discussed above, the invention particularly contemplates utilization of the material having improved flowability in the production of articles having an element formed of an extended layer of thermoplastic material, such as molded, hollow thermoplastic articles and such as rug backing and the like. The material having good flow properties is caused to flow so that the thermoplastic material is distributed to form the layer desired, and the material is heated to fuse the particles together and form the layer as a continuous structure of the thermoplastic material. The distribution of the material and the heating can proceed simultaneously so that some fusion occurs while the particles are being distributed. In molding as is contemplated by the invention, it is preferred, however, that the material not be distributed entirely as a melt, but rather that the distribution take place at least in part with the thermoplastic material in finely divided form.

The invention is further described in the following example.

*Example 1*

A blender as is shown in FIG. 1 is 30″ I.D. x 4 ft. long; has a 3″ shaft with seven cross rods, each have a plow head at each end thereof; scrapers are provided as is indicated in the drawing; the outlet is 4″ x 4″ square conduit communication with the blender adjacent the end opposite the inlet, at about 9 o'clock, viewed from the outlet end and for clockwise rotation of the shaft (viewed from the outlet end); the motor drive is a 30 HP, 40 amp., connected to the blender shaft to rotate the shaft at 500 r.p.m.

A pulverized, −35 mesh, low density, high pressure polyethylene having a melt index of about 20 and a density (polyethylene manufacturer's specification for material without regard to particle size) of 0.92 was processed at the rate of 700 pounds per hour; hold-up, about 50 pounds. The temperature in was about 60° F., temperature out, about 200° F. Size of the product was −35 mesh. Bulk density out was 36 grams/100 cc.

For start-up, the valve in the outlet can be closed down to limit flow from the vessel until the desired operating temperature is reached; the valve can then be opened so as to maintain this temperature. Flowability determined by filling a funnel, opening the stem to flow, and measuring the time required for emptying was as follows: for feed, from zero flow to 9 seconds; for product, 5 seconds. The funnel used has a cone 15 cm. diameter by 12 cm. high, a stem 11 mm. I.D. x 15 cm. long.

*Example 2*

A unit like that described in Example 1, but larger, has the following specifications: I.D. 54", length 6'; 5 cross rods; motor 30 HP, shaft r.p.m. 120; outlet 4" x 4". This unit has a tip speed of about half that of the unit of Example 1; it is less sensitive to changes in operation conditions. For treating feed material as described in Example 1, at the same throughput and same product conditions, the hold-up is about 1000 pounds.

In general, based on testing as is reported in Example 1, the invention provides an improvement of about 20–50% in flowability. Thus, in Example 1, the untreated material had 9 seconds flow, whereas the treated material had 5 seconds flow, for an improvement of 4 seconds, or about 45%.

Improvement in flowability is also indicated by reduction in the angle of recline. Thus, the angle of recline of the starting material can be about 60–70° and the angle following the treatment according to the invention, about 40–50°. A reduction of about 20% is desirable and can be conveniently obtained by the method of the invention.

Improvement in density can be about 10–40%. Thus, in Example 1, the bulk density was increased from 0.28 to 0.36, for an increase of 0.08, which is about a 28% improvement.

In the case of utilization of the material for rug backing, the improved flowability of the product provided by the invention greatly facilitates the spreading of the finely divided material over the back of the rug as is practiced in application of the resin to the rug. In the case of fluid bed coating or other operations wherein the resin is provided as a fluidized bed, the pulverized material as is used as starting material in the procedure of the invention is generally unsatisfactory in that transition of the material from a bed at rest to a fluidized condition (which is effected by passing a gas stream through the bed) is complicated by the fact that the transition is not made gradually, and the gas tends to blow through the finely divided material. Utilizing finely divided material as is produced according to the invention, the transition can be made gradually and without difficulty. Similarly, in other procedures such as slush molding, rotational molding, and coloring, the benefits according to the invention are realized as the mass of material is caused to flow in the practice of such procedures.

While the invention has been described in respect to particular embodiments thereof, these embodiments are merely representative of the instant invention, and do not serve to set forth the limits thereof.

What is claimed is:

1. The method of treating thermoplastic resin in finely divided form to improve flowability thereof, the resin particles having relatively poor flow properties, which comprises agitating a mass of the particles to generate heat therein from friction between the particles to heat the particles substantially without occurrence of agglomeration thereof, continuing said agitating for a time sufficient for modification of the particles providing them with substantailly improved flowability.

2. The method of claim 1, wherein the thermoplastic resin in finely divided form is a pulverized thermoplastic resin.

3. The method of claim 1, wherein the thermoplastic resin is provided in said finely divided form having relatively sharp protuberances by pulverizing at normal temperature.

4. The method of claim 1, wherein said thermoplastic resin in finely divided form is a resin selected from the group consisting of polyethylene and polypropylene.

5. The method of claim 4, wherein the said resin is pulverized resin.

6. The method of claim 1, wherein said thermoplastic resin having relatively sharp protuberances is in particle size in the range of about 100% —12 mesh, 10% —100 mesh to 100% —80 mesh, 10% —200 mesh.

7. The method of treating thermoplastic resin in finely divided form to improve flowability thereof, the resin particles having relatively poor flow properties, which comprises continuously introducing the resin into a treating zone to provide a mass of the particles in said zone, agitating the mass of particles in said zone to generate heat therein from friction between the particles to heat the particles substantially without occurrence of agglomeration thereof, continuing said agitating for a time sufficient for modification of the particles providing them with substantially improved flowability, and continuously withdrawing resin particles having said improved flowability from said zone.

8. The method of producing articles having an element formed of an extended layer of thermoplastic material, which comprises:
    (a) pulverizing pellets of the thermoplastic material to provide the resin in finely divided form;
    (b) agitating a mass of the finely divided particles to generate heat therein from friction between the particles to heat the particles substantially without occurrence of agglomeration thereof; continuing said agitating for a time sufficient for modification of the particles providing them with substantially improved flowability;
    (c) following said agitating, causing the finely divided material to flow so that the thermoplastic material is distributed to form said layer;
    (d) heating the finely divided material to fuse the particles together and form said layer as a continuous structure of the thermoplastic material.

9. The method of claim 8, wherein said pulverizing is a normal temperature pulverizing.

10. Method according to claim 8, wherein said thermoplastic material is a resin selected from the group consisting of polyethylene and polypropylene.

11. Method according to claim 10, wherein said pulverizing is a normal temperature pulverizing.

12. The method of claim 8, wherein said thermoplastic material is pulverized to a particle size in the range of about 100% —12 mesh, 10% —100 mesh to 100% —80 mesh, 10% —200 mesh.

13. The method of treating thermoplastic resin in finely divided form to improve flowability thereof, which comprises:
    (a) introducing the material in finely divided form into a blender comprising a vessel having stirrers therein and means for moving the stirrers to agitate material contained in the blender,
    (b) collecting a mass of said finely divided material in the blender for agitation by said stirrers,
    (c) operating said stirrers to agitate the material to generate heat therein from friction between the particles to heat the particles substantially without occurrence of agglomeration thereof, continuing said agitating for a time sufficient for modification of the particles providing them with substantially improved flowability,
    (d) and withdrawing the finely divided material having improved flow properties.

14. Method according to claim 13, said finely divided thermoplastic resin being a pulverized resin.

15. Method according to claim 13, wherein a thermoplastic material is pulverized at normal temperature to provide said resin in finely divided form.

16. Method according to claim 13, wherein said thermoplastic resin is selected from the group consisting of polyethylene and polypropylene.

17. Method according to claim 16, wherein said resin is pulverized at normal temperature to provide it in said finely divided form.

18. The method according to claim 13, wherein said thermoplastic resin is in particle size in the range of about 100% −12 mesh, 10% −100 mesh to 100% −80 mesh, 10% −200 mesh.

References Cited by the Examiner
UNITED STATES PATENTS

| | | | |
|---|---|---|---|
| 2,858,299 | 10/1958 | Guzzetta | 260— 94.9 |
| 3,078,518 | 2/1963 | Robinson et al. | 264—15 |

ROBERT F. WHITE, *Primary Examiner.*